United States Patent [19]

Celentino

[11] Patent Number: 4,568,099
[45] Date of Patent: Feb. 4, 1986

[54] VEHICLE-TO-VEHICLE CONNECTION MECHANISM

[75] Inventor: James L. Celentino, Macomb, Mich.

[73] Assignee: The United States of America as represented by the Secretary of the Army, Washington, D.C.

[21] Appl. No.: 637,250

[22] Filed: Aug. 2, 1984

[51] Int. Cl.$^4$ .............................................. B60D 1/00
[52] U.S. Cl. ................................ 280/478 B; 172/275; 280/477; 280/479 R
[58] Field of Search ............... 280/477, 478 B, 479 R, 280/478 A, 474, 483, 484, 509, 510; 172/275; 403/328, 327; 213/75 R, 182, 183, 185

[56] References Cited

U.S. PATENT DOCUMENTS

| 37,612 | 2/1863 | Collyer | 213/185 |
| 1,851,843 | 3/1932 | Inman | 403/327 |
| 2,248,005 | 7/1941 | Lyman | 280/510 |
| 4,284,291 | 8/1981 | Morlok | 280/479 R |
| 4,421,340 | 12/1983 | Kramer et al. | 280/477 |

FOREIGN PATENT DOCUMENTS

| 44968 | 2/1974 | Australia | 280/478 B |
| 2845132 | 4/1980 | Fed. Rep. of Germany | 280/477 |

Primary Examiner—Joseph F. Peters, Jr.
Assistant Examiner—Mark C. Dukes
Attorney, Agent, or Firm—Peter A. Taucher; Gail S. Soderling; Robert P. Gibson

[57] ABSTRACT

A device for temporarily attaching two vehicles to form a united structure. The device has a rod which extends from the first vehicle into a complimentary grasping means on the second vehicle. The grasping means can be activated to hold the rod firmly so retraction towards the first vehicle will draw the vehicles together.

6 Claims, 2 Drawing Figures

VEHICLE-TO-VEHICLE CONNECTION MECHANISM

GOVERNMENT INTEREST

The invention described herein may be manufactured, used, and licensed by or for the Government for governmental purposes without payment to me of any royalty thereon.

BACKGROUND OF THE INVENTION

In one aspect this invention relates to devices for joining vehicles. In a further aspect this invention relates to hydraulic connection devices.

Under some conditions it is desirable to have portions of a large multi-component system disposed on several trucks or other movable carrier vehicles for transportation or the like. When the equipment is to be used, the carrier vehicles should be joined together to form a stable platform for the system's components. The vehicles should be driven to a common location and parked in a side by side relationship. The connecting mechanism can be used to join the two vehicles and draw them into a predefined relationship to minimize the difficulty of joining the various parts of the system. The attachment should be implemented without the operator having to leave the vehicle and in a short period of time on the order of one to two minutes.

BRIEF SUMMARY OF THE INVENTION

The present invention provides an attaching device for connecting two vehicles, the device being operable by an operator from inside one of the vehicles. The device has a first mounting bracket affixed to one of the vehicles. A hydraulic cylinder is journaled to the mounting bracket with its longitudinal axis extending perpendicular to the side of the vehicle. A rod has one end maintained within the tube and a second end with a ball attached. The hydraulic cylinder is adapted to move the rod between retracted and extended positions. A second mounting bracket is attached to the second vehicle to be joined by the bracket having a pair of biased detents adapted to allow passage of the ball therebetween and having associated locking fingers which can be activated to prevent withdrawl of the ball. When the ball is firmly grasped by the detents the hydraulic cylinder can retract the rod to draw the vehicles together.

Auxiliary alignment means can be used to ensure proper positioning of the trucks vis-a-vis one another.

DETAILED DESCRIPTION OF A PREFERRED EMBODIMENT

Figure 1:
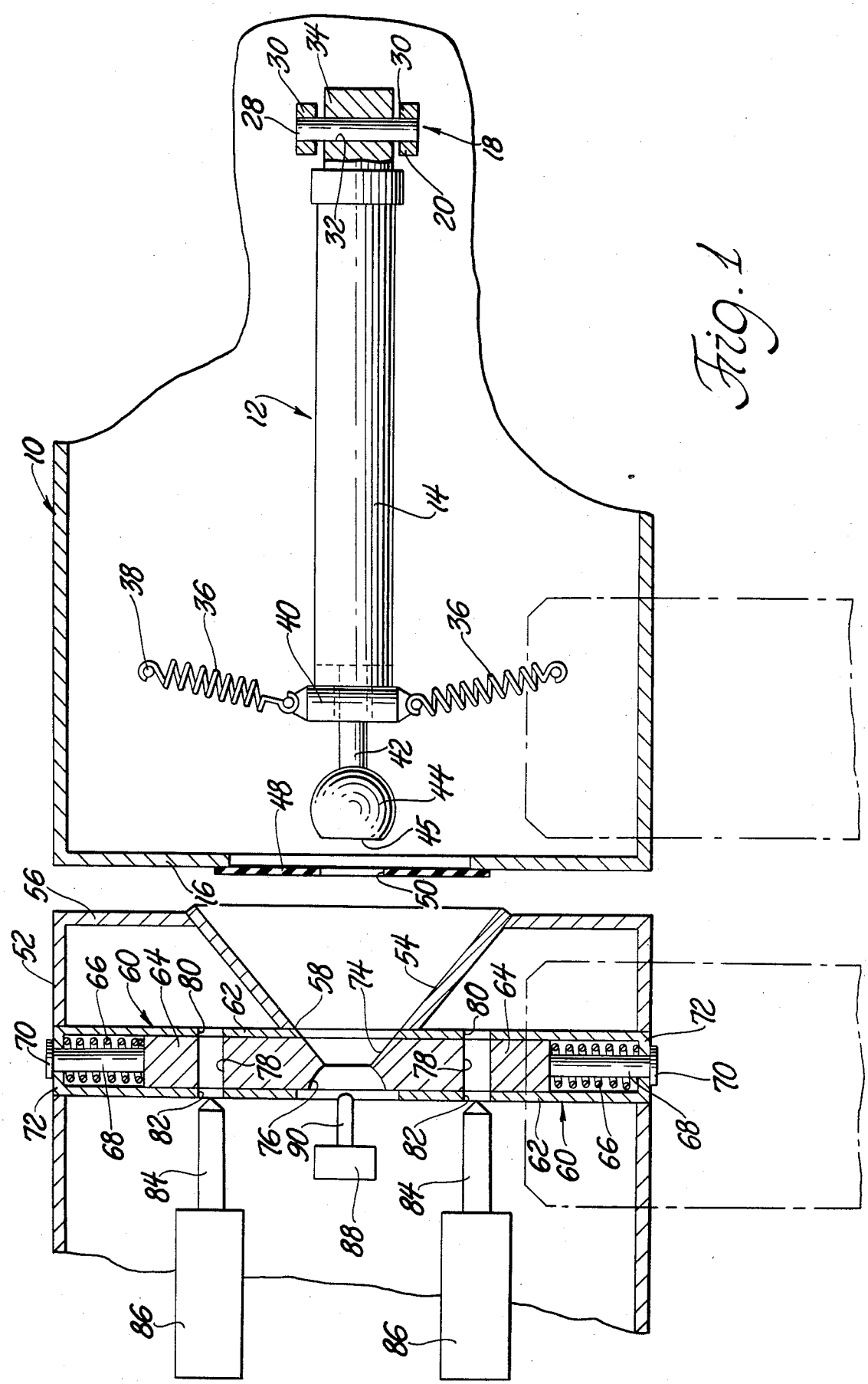
FIG. 1 is a side view of an attachment according to this invention.

In the accompanying drawing in which like reference numerals refer to like parts, a first vehicle 10 has a first mounting device 12 attached to the frame of the vehicle. A hydraulic cylinder 14 is mounted with its longitudinal axis directed perpendicular to a side wall 16 of vehicle 10.

Figure 2:
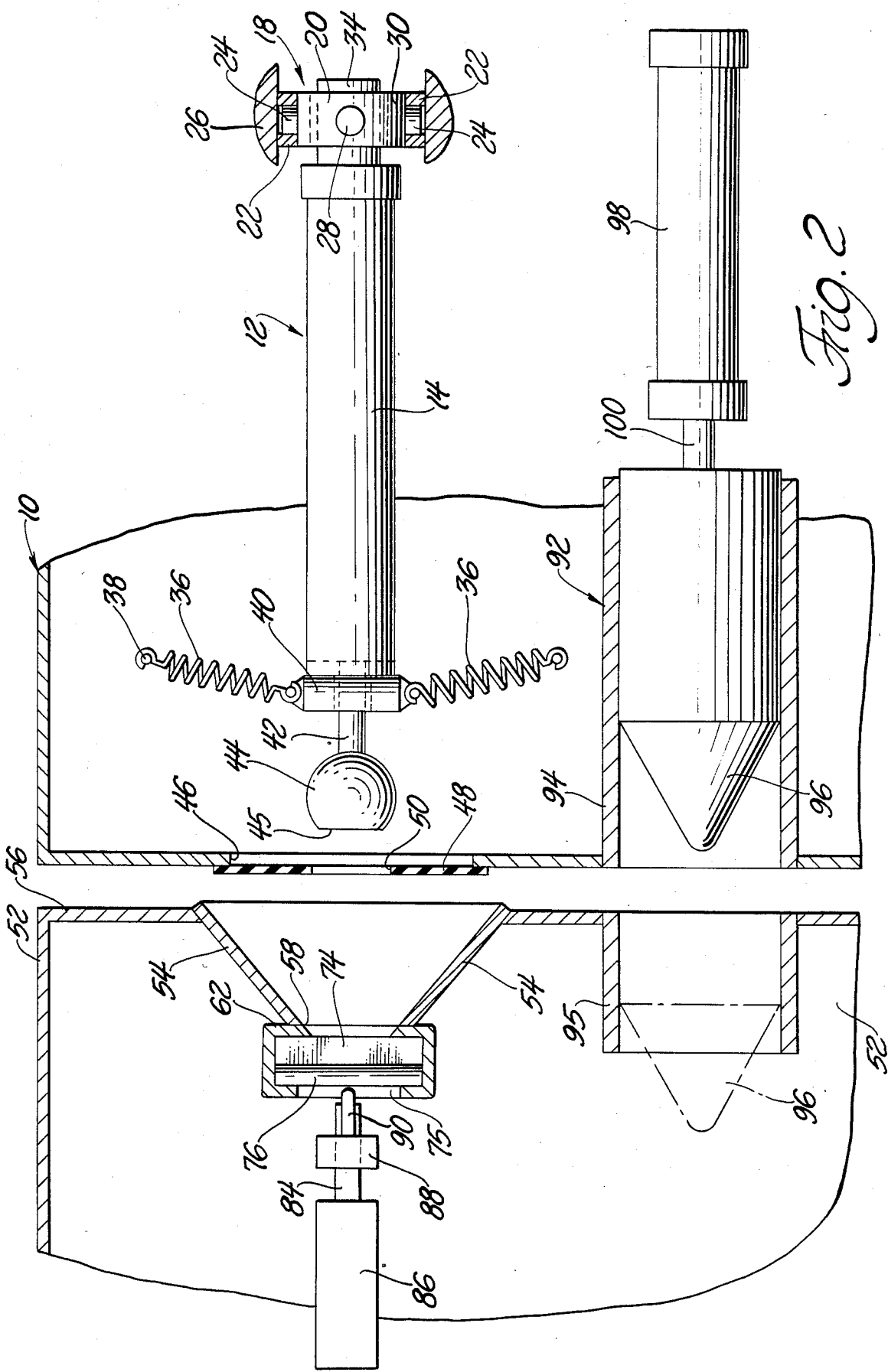
FIG. 2 is a top view of the device of FIG. 1 with an associated alignment means.

The hydraulic cylinder 14 is supported at one end by a universal joint 18. A yoke 20 in FIG. 2 is rotatably mounted within a bearing housing 22 by means of a pair of stub shafts 24; the bearing housing is in turn mounted on a frame member 26. A shaft 28 is disposed between the arms 30 and passes through an aperture 32 in a boss 34. The shaft 28 allows hydraulic cylinder 14 to rotate in a plane perpendicular to the plane of the drawing in FIG. 1 and the yoke 20 allows rotation of the hydraulic cylinder about the stub shafts 24 in the plane of the drawing in FIG. 1. The cone of the volume through which the hydraulic cylinder can be moved can be varied to suit the conditions but a cone of about 4–8 steradians is acceptable for most applications.

The other end of the hydraulic cylinder is held in suspension by a plurality of springs 36 having one end engaging a pin 38 attached to frame 26 and the other end of the spring engaging a collar 40 which is disposed about the free end of hydraulic cylinder 14. As shown there are four springs disposed at equal angles about the hydraulic cylinder 14 to hold the cylinder with its longitudinal axis pointed approximately normal to the side wall 16 of the vehicle 10.

The hydraulic cylinder 14 has an attachment rod 42 mounted coaxially within the cylinder and attached to a piston (not shown) located within the cylinder. The pressure on the piston can be applied so as to extend or retract the rod. The attachment rod 42 has a ball 44 attached to the free end of the rod extending outward from the cylinder. As shown ball 44 has a flat leading surface 45 formed on the side of the ball opposite the rod 42. The rod when extended will pass through an opening 46 in the side wall 16 of the truck 10 and a flexible shield 48 mounted to cover a substantial portion of the aperture, the flexible shield having an opening 50 to facilitate egress of the ball 44 and attachment rod 42 when the rod is extended.

The second vehicle 52 has a frusto-conical member 54 mounted on a side wall 56 at approximately the same location on the vehicle as the opening 46 of the first vehicle 10. The frusto-conical member is mounted with the base at the outer position of the vehicle and the frustum 58 is located within the vehicle to provide a funnel suitable for receiving the ball 44 and directing it to a fixed location within the vehicle.

A pair of opposed elongated C-shaped brackets 60 are mounted within the vehicle, the common longitudinal axis of the elongated C-shaped brackets is perpendicular to the axis of the frusto-conical member. The axis is at a position further inside the vehicle then the frustum, one wall 62 of the C-shaped bracket being attached to the frustum.

A pair of detents 64 are mounted within the C-shaped brackets 60 and can move longitudinally within the C-shaped brackets. The detents 64 have associated coil springs 66 to bias the detents radially inward towards the axis of the frusto-conical member 54. The springs surround and are coaxially mounted about pins 68 which are attached to the radially outward end of the detents. The pin 68 has a head 70 which limits the inward position of the detent when the head 70 contacts an end wall 72 of the C-shaped bracket 60. The inner end of the detent is shaped with an outward face 74 shaped so as to continue the shape of the frustoconical member 54 and providing a ramp suitable for the application of a force from the ball 44 causing the detents to radially separate. The inboard side of the detent has a partial spherical concavity 76, the concavity being shaped as to engage the surface of the ball 44 adjacent the rod 42 when the ball has passed between the detents.

The detents 64 have a transverse bore 78 which is aligned with a corresponding pair of holes 80, 82 formed in facing walls of the C-shaped brackets 60. Complimentary locking pins 84 are positioned by positioning means represented as hydraulic cylinders 86 between a retracted position where the detents are free to move radially and a locking position (not shown) where the locking pin passes through aperatures 80, 82 and bore 78 to lock the detents in their innermost position and prevent the detents from moving if a seperating force is applied by the ball being retracted from the detents.

A sensing switch 88 is located at a position inside the vehicle 52 at a position where the flat surface 45 on the ball will contact a sensing finger 90 and move the finger to activate the sensor signaling that the ball has essentially passed between the detents.

As shown in FIG. 2 the attaching device described before preferably has an alignment mechanism 92 comprising a first sleeve 94 mounted on the first vehicle 10 and a second sleeve 95 mounted on the second vehicle 52. An aligning head 96 is shown in the retracted position in FIG. 2 and the extended position in phantom. When the vehicles are being attached, the aligning head 96 is moved to engagement with the second sleeve by the action of an aligning hydraulic cylinder 98, pushing a rod 100. In general there are 2 or more attaching and aligning mechanisms per vehicle.

OPERATION

To join two vehicles using the device of this invention vehicles having corresponding mating parts of the mechanism are driven to a side by side relationship and parked with the complimentary parts as closely aligned as possible; within 10" between vehicles and within a 6" tolerance radius (12" dia. circle) for the vertical and longitudinal directions. The hydraulic cylinder 14 is activated and the rod 42 extends the ball 44 through the aperture 50 in flexible shield 48. As the ball 44 progresses towards the frusto-conical member if there is any misalignment, the surface of the ball will contact the inner surface and the camming action will cause the ball to slide towards the area between the detents. The camming action will overcome the biasing force of the springs 36 and the hydraulic cylinder is free to move throughout a cone defined by the U joint structure 18 fastening the hydraulic cylinder to the first vehicle 10.

As the ball contacts the ramp 74 on the detents and presses inward, the ball will force its way inward forcing the detents apart against the biasing spring forces (springs 66) until the maximum diameter of the ball has passed beyond the plane defined by the intersection between the ramp and the spherical concave surface 76. As the ball moves further into the second vehicle the springs will force the detents to close firmly behind the ball and snuggly grasp the ball.

The ball's flat surface 45 pressing against the sensing finger will activate the sensing switch 88 and in turn signals the cylinders 86 to start engagement, and also signals the cylinder 14 to stop further extension of rod 42. The locking pins are automatically moved to their locking position passing through the holes 80, 82 in the C-shaped bracket 60 and the transverse bore 78. When the locking pins are in position, the detents are prevented from moving and the ball is entrapped.

After the ball is firmly entrapped, the hydraulic cylinder 14 is automatically activated and the rod 42 drawn or retracted. The resulting pulling force will move the vehicles closer together until they are in the desired juxtaposed condition.

As the vehicles are being pulled to the final position the alignment mechanism can be activated with the aligning cylinder 98 driving the aligning head 96 out of the first sleeve 94 and into the second sleeve 95. The aligning mechanism provides a relatively rigid connection to trim the vehicles into vertical and horizontal alignment. The pointed nose on the aligning head allows for some vertical or horizontal misalignment not corrected by the attaching mechanism. Once the alignment head is fully engaged with the second sleeve 95 the activating cylinder can be turned off and further power expenditure saved as the hydraulic cylinder 14 continues to pull the vehicles together. If desired the hydraulic cylinders 14 can be energized so as to provide a constant force pulling the vehicle together.

The entire operation can be performed quickly, on the order of one to two minutes and without the necessity of the operator leaving the vehicle.

I wish it to be understood that I do not desire to be limited to the exact details of construction shown and described for obvious modifications will occur to a person skilled in the art, without departing from the spirit and scope of the appended claims.

I claim:

1. A device for joining two vehicles to align and position the vehicles comprising; a first attaching member mounted within the first vehicle, the first attaching member including an attachment rod mounted within the first vehicle so that the first attaching member's axis is substantially perpendicular to the side of the vehicle; means for extending and retracting the rod along its longitudinal axis to a position with an outboard end of the rod outside the vehicle; an attachment member connected to the outboard end of the attachment rod; a second attaching member mounted within the second vehicle including a frusto-conical member mounted in the side wall of the second vehicle with the base of the frusto-conical member in the side wall and the frustum located within the second vehicle, for receiving and directing the attachment memeber when the attachment rod is extended towards the second vehicle; a pair of opposed detents mounted in communication with said receiving means, said detents being located at the frustum of the frusto-conical member and adapted for motion perpendicular to the axis of the frusto-conical member upon insertion of the attachment member said detents having a bore therethrough and being mounted in C-shaped brackets with complimentary apertures, the detents having a shaped end on the detent end nearest the frustum of the frusto-conical member the shaped end of the detents have a cam surface so extension of the attachment member will separate the detents; a biasing means associated with the detents to bias the detents towards the frusto-conial member's longitudinal axis, to force the detents into a grasping position about the attaching rod entrapping the attachment member; locking pins associated with the detents which can be forced into the apertures to lock said detents in their retention position preventing the detents from separating when the attachment rod is retracted; a sensor adapted to be contacted by the attachment member when the attachment member has passed between the detents to a position where the baising means has forced the detents back to their innermost entrapping position and activating said locking means; to lock the detents in their entrapping position so that retraction of the attaching rod will draw the vehicles closer together.

2. The joining device of claim 1 wherein said extending and retracting means is a hydraulic cylinder.

3. The joining device of claim 1 wherein said attachment means is a ball mounted on the outboard end of said attaching rod, said ball having a flattened face opposite the point of attachment of said rod to provide a surface for contacting said sensor.

4. The joining device of claim 2 wherein said hydraulic cylinder has an inboard end mounted to the vehicle by means of a universal joint and an outboard end mounted to the vehicle by means of a plurality of radially extending springs to allow limited motion of the attachment rod within a cone.

5. The device of claim 1 wherein said joining device has associated therewith a hydraulic ram located proximally the first attachment means, said ram having mounted thereon an alignment head mounted for longitudinal motion within a first sleeve and a second sleeve mounted in said second vehicle proximal said second attachment means so that upon extension of said alignment head from said first sleeve into said second sleeve the vehicles will be further aligned.

6. A device for joining two vehicles to align and position the vehicles comprising; a first attaching member mounted within the first vehicle, the first attaching member including a hydraulic cylinder; a universal joint attaching one end of the hydraulic cylinder to the vehicle; a plurality of radially extending springs having one end attached to the vehicle and the other end attached to the end of the hydraulic cylinder opposite the universal joint to support the end of the hydraulic cylinder opposite the universal joint so that the hydraulic cylinder is supported with its longitudinal axis disposed perpendicular to the side of the first vehicle; an attachment rod coaxially mounted to the hydraulic cylinder with a first end disposed within and connected to the hydraulic cylinder so that the cylinder can axially move the rod and a second end extending toward the side of the vehicle; an attachment ball connected to the second end of the attachment rod, sad ball having a flattened face on the side of the ball opposite the point of attachment between the rod and the ball; a second attaching member mounted within the second vehicle including a frusto-conical member mounted to the side of the second vehicle with its base at the wall and the frustum located within the vehicle; a pair of C-shaped brackets mounted at the frustum end of the frusto-conical member the brackets being disposed with their longitudinal axis perpendicular to the frusto-conical member's axis with the open sides of the C-shaped members facing each other, the C-shaped members having apertures in the legs; a pair of detents one detent being disposed within each C-shaped housing; the detents having a shaped end located nearest the frusto-conical member's axis, the shaped end of the detents have a cam surface on the side of the detent nearest the frusto-conical member and a concave groove formed on the other side of the detent, each of the detents having a bore therethrough which corresponds to the apertures in the C-shaped member; coil spring biasing means associated with the detents to bias the detents towards the frusto-conical member's axis; a pin associated with the detent to position the detent within the C-shaped member with the bore in the detents aligned with the apertures in the C-shaped member absent a separating force; a sensor adapted to be contacted by the flat surface of the ball when the ball has passed between the detents to a position where the coil spring biasing means has forced the detents back to their innermost position; locking pins adapted to engage the apertures in the C-shaped member and the bore in said detents to lock the detents in the innermost position to prevent withdrawal of the ball when the attachment rod is withdrawn by the hydraulic cylinder whereby the two vehicles can be drawn into close proximity by the hydrualic cylinder; and further including an alignment device for further aligning the vehicles as they are brought in to juxtaposition said alignment device having an alignment hydraulic ram located within one of said vehicles, at a position near the attachment means and having the hydraulic ram's longitudinal axis parallel to the axis of the attachment rod, said attachment ram having an alignment head mounted for longitudinal motion within an associated first sleeve; and a second sleeve mounted in the other vehicle to receive said alignment head so that upon extension of the alignment head from the first sleeve into the second sleeve the vehicles will be further aligned.

* * * * *